United States Patent [19]

Huber et al.

[11] Patent Number: 5,321,443
[45] Date of Patent: Jun. 14, 1994

[54] REMOVABLE SUNGLASS ASSEMBLY FOR ATTACHMENT TO A CONVENTIONAL EYEGLASS ASSEMBLY

[76] Inventors: Richard E. Huber, 9260 Shoshone Rd., Chipita Park, Colo. 80809; Christopher C. Marselli, 1506 N. El Paso St., Colorado Springs, Colo. 80907

[21] Appl. No.: 712,596

[22] Filed: Jun. 10, 1991

[51] Int. Cl.$^5$ ............................ G02C 9/00; G02C 7/10
[52] U.S. Cl. .................................... 351/47; 351/41; 351/44
[58] Field of Search .................... 351/41–49, 351/57, 58, 83–86, 110–111; 2/441–444, 13, 432

[56] References Cited

U.S. PATENT DOCUMENTS

| | | | |
|---|---|---|---|
| 3,427,098 | 2/1969 | Johnston | 351/47 |
| 3,526,449 | 9/1970 | Bollé et al. | 351/41 |
| 3,531,188 | 9/1970 | LeBlanc et al. | 351/48 |
| 3,536,385 | 10/1970 | Johnston | 351/47 |
| 3,876,295 | 4/1975 | Loughner | 351/47 |
| 3,901,589 | 8/1975 | Brenenfeld | 351/47 |
| 4,187,006 | 2/1980 | Nerdell | 351/57 |
| 4,240,718 | 12/1980 | Wichers | 351/111 |
| 4,247,178 | 1/1981 | Cook | 351/58 |
| 4,515,448 | 5/1985 | Tackles | 351/41 |
| 4,534,627 | 8/1985 | Vosper | 351/47 |
| 4,659,196 | 4/1987 | Gazeley | 351/47 |
| 4,729,650 | 3/1988 | Jennings | 351/47 |
| 4,741,611 | 5/1988 | Burns | 351/41 |
| 5,007,727 | 4/1991 | Kahaney et al. | 351/47 |

FOREIGN PATENT DOCUMENTS

| | | | |
|---|---|---|---|
| 48306 | 6/1983 | European Pat. Off. | 351/47 |
| 424166 | 4/1991 | European Pat. Off. | 351/47 |

*Primary Examiner*—Loha Ben
*Assistant Examiner*—Thong Nguyen
*Attorney, Agent, or Firm*—Phillip A. Rein

[57] ABSTRACT

A removable sunglass assembly to be attached to a conventional eyeglass assembly having lenses, a lens frame, and bow members extending aft from the frame. The preferred embodiment of the removable sunglass assembly includes a one-piece lens member having side support members with the lens member serving as the frame, side support members, and a top support member. The resiliency of the one-piece arcuate lens member provides a clamping force by which the removable sunglass assembly can be attached to the conventional eyeglass assembly. The side support members locate and attach the removable sunglass assembly to the bow members of the conventional eyeglass assembly while a top support member locates the removable sunglass assembly to the top of the conventional eyeglass assembly. Reliable securing elements are provided by resilience of the material used to construct the arcuate lens member and the high-friction, resilient, and anti-skid material used to construct the side support members. A second embodiment of the removable sunglass assembly provides a main top support member achieving the function of the arcuate lens member as noted above.

15 Claims, 3 Drawing Sheets

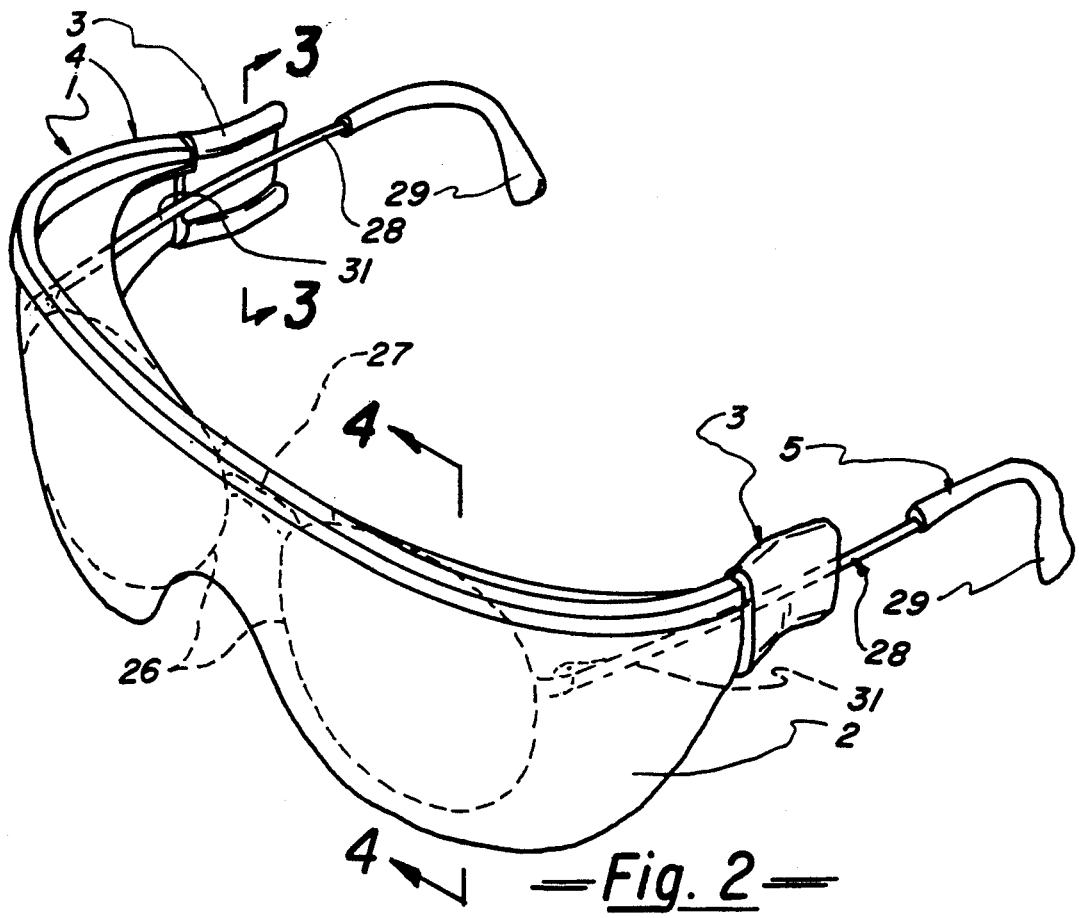
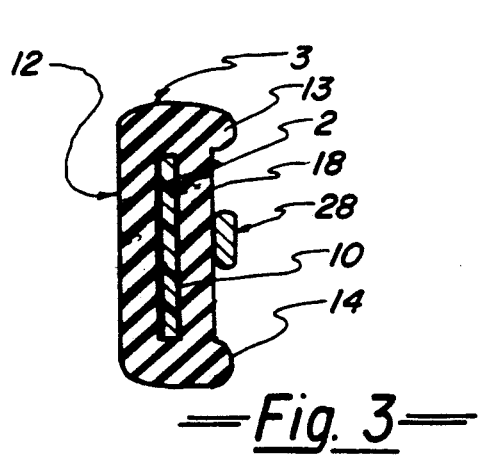
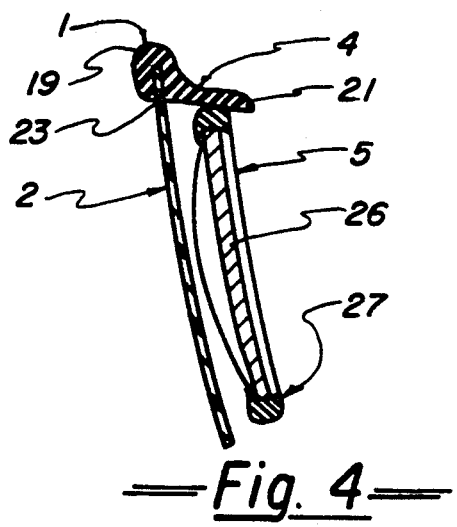

REMOVABLE SUNGLASS ASSEMBLY FOR ATTACHMENT TO A CONVENTIONAL EYEGLASS ASSEMBLY

PRIOR ART

A patent search on this invention revealed the following United States Patents:

| Pat. No. | Invention | Inventor |
|---|---|---|
| 3,427,098 | SUNSHADE ATTACHMENT FOR EYEGLASSES | Donald J. Johnston |
| 3,526,449 | ONE-PIECE SUNGLASSES | Bolle et al |
| 3,531,188 | FLIP-UP LENSES FOR SPECTACLES | Leblanc et al |
| 3,876,295 | AUXILIARY CLIP-ON EYE PROTECTORS | Larry G. Loughner |
| 3,901,589 | CLIP-ON FLIP-UP GOGGLES | Harold Bienenfeld |
| 4,187,006 | FLIP-DOWN SUNGLASSES | Saul Neidell |
| 4,247,178 | CLIP-ON SUNGLASSES | Joseph E. Cook |
| 4,534,627 | SUNGLASSES PIVOTALLY MOUNTED ON BROWBAR OF SPECTACLE FRAME | George W. Vosper |
| 4,659,196 | OPTICAL ACCESSORY FOR USE WITH SPECTACLES | Albert E. Gazeley |
| 4,729,650 | REMOVABLE SUNGLASSES FOR USE WITH CONVENTIONAL EYEGLASSES | Lucinda K. Jennings |

The Johnston patent discloses a sunshade attachment for eyeglasses that has separate sunshade eye pieces pivotally connected in order to independently cover an individual corrective lens.

The Bolle et al patent discloses a one-piece sunglass structure.

The Leblanc et al patent discloses known flip-up lenses for spectacles.

The Loughner, Cook, Vosper, and Gazeley patents disclose the conventional clip-on type sunglasses utilized to be attached to conventional eyeglasses.

The Bienefeld patent discloses clip-on flip-up goggles to be attached to conventional eyeglasses.

The Niedell patent discloses flip-down sunglasses usable for athletic competition.

The Jennings patent discloses removable sunglasses for use with conventional eyeglasses using flexible fabric fasteners such as Velcro for connection to the eyeglass frame.

BACKGROUND OF THE INVENTION

About 50% of the people in the U.S. require prescription eyewear. The vast majority of these people wear conventional eyeglasses and even the people who wear contact lenses will wear eyeglasses from time to time. For these people, the solutions for addressing their sunglasses needs are not satisfactory.

One solution is to wear photo-gray lenses in their glasses. This solution is reasonably good at providing an "all-in-one" solution. However, these lenses usually take a while to change plus they are not as stylish as most sunglasses, and can be very heavy as the lenses must be made of glass. Another possible solution is to maintain two pairs of glasses, one with regular lenses and one with tinted lenses. This solution is attractive and feasible if the individual can afford both pairs and wear the sunglasses for extended periods, thus avoiding frequent switching of glasses.

Yet another solution is to wear a pair of tinted goggles over the prescription glasses. These are functional, but awkward and not very stylish. The final alternative is the conventional clip-on which is generally flimsy and not very stylish, standing out obviously as clip-ons. The clip-ons are not very versatile with each type of clip-on fitting only a limited set of eyeglass frames. Even if a person is able to find a clip-on that fits, the attachment is likely to be unreliable and lost or damaged in a strenuous activity such as snow skiing.

As a consequence, it is the object of this invention to provide to those who wear conventional eyeglasses an improved removable sunglasses design that is 1) easily attached and detached to and from a large variety of eyeglass frames; 2) securely mounted with respect to the frames; 3) comparable to conventional sunglasses in fashion and attractiveness; 4) simple and economical to manufacture; and 5) designed for reliability with a minimum number of parts with no conventional clips, springs, screws, or moving parts.

PREFERRED EMBODIMENT OF THE INVENTION

In one preferred embodiment of this invention, a removable sunglass assembly is operable to be attached to a conventional eyeglass assembly. The removable sunglass assembly has an arcuate lens member having side support members connected to outer spaced parallel ends thereof and a top support member connected to a top edge of the arcuate lens member.

The arcuate lens member and the top support member are operable to provide strength and flexibility to each other so that outer arcuate side sections of the arcuate lens member are biased inwardly.

Each of the side support members are constructed of a resilient, high-friction, anti-skid material having a lens slot extended therethrough to respectively receive connector lugs from opposite spaced ends of the arcuate lens member.

The removable sunglass assembly is operable to be placed over and about a lens frame on the conventional eyeglass assembly. More specifically, the side support members are biased inwardly against an outer surface of bow members of the conventional eyeglass assembly.

A second embodiment of this invention involves a removable sunglass assembly having individual lens members connected to a top support member having connected thereto spaced side support piece members having respective side support members mounted thereon. The arcuate top support member provides a biasing force inwardly at outer ends thereof.

The side support members of the second embodiment are similar to those of the first embodiment being constructed of a resilient, anti-skid, high-friction type material to contact the outer bow members of the conventional eyeglass assembly.

OBJECTS OF THE INVENTION

One object of this invention is to provide a removable sunglass assembly including a resilient one-piece arcuate lens member secured along an upper edge to a top support member and having side support members for contact against outer surfaces of bow members on a conventional prescription eyeglass assembly to hold the same thereon.

Another object of this invention is to provide a removable sunglass assembly including an arcuate lens member having outer ends biased inwardly to apply pressure against an outer surface of bow members on a conventional eyeglass assembly.

One other object of this invention is to provide a removable sunglass assembly for attachment to a conventional prescription eyeglass assembly in a very simple operation whereby the sunglass assembly of this invention can be added and removed therefrom with a minimum amount of time and effort involved.

Still, one other object of this invention is to provide a removable sunglass assembly which can be attached to a conventional eyeglass assembly which is attractive in appearance; easy to install and remove; easily carried as an accessory to the conventional eyeglass assembly; economical to manufacture; and substantially maintenance free.

Various other objects, advantages, and features of the invention will become apparent to those skilled in the art from the following discussion, taken in conjunction with the accompanying drawings, in which:

FIGURES OF THE INVENTION

FIG. 2 is a perspective view of the removable sunglass assembly of this invention as mounted on a conventional eyeglass assembly;

FIG. 3 is an enlarged sectional view taken along line 3—3 in FIG. 2;

FIG. 4 is an enlarged sectional view taken along line 4—4 in FIG. 2; and

Figure 1:
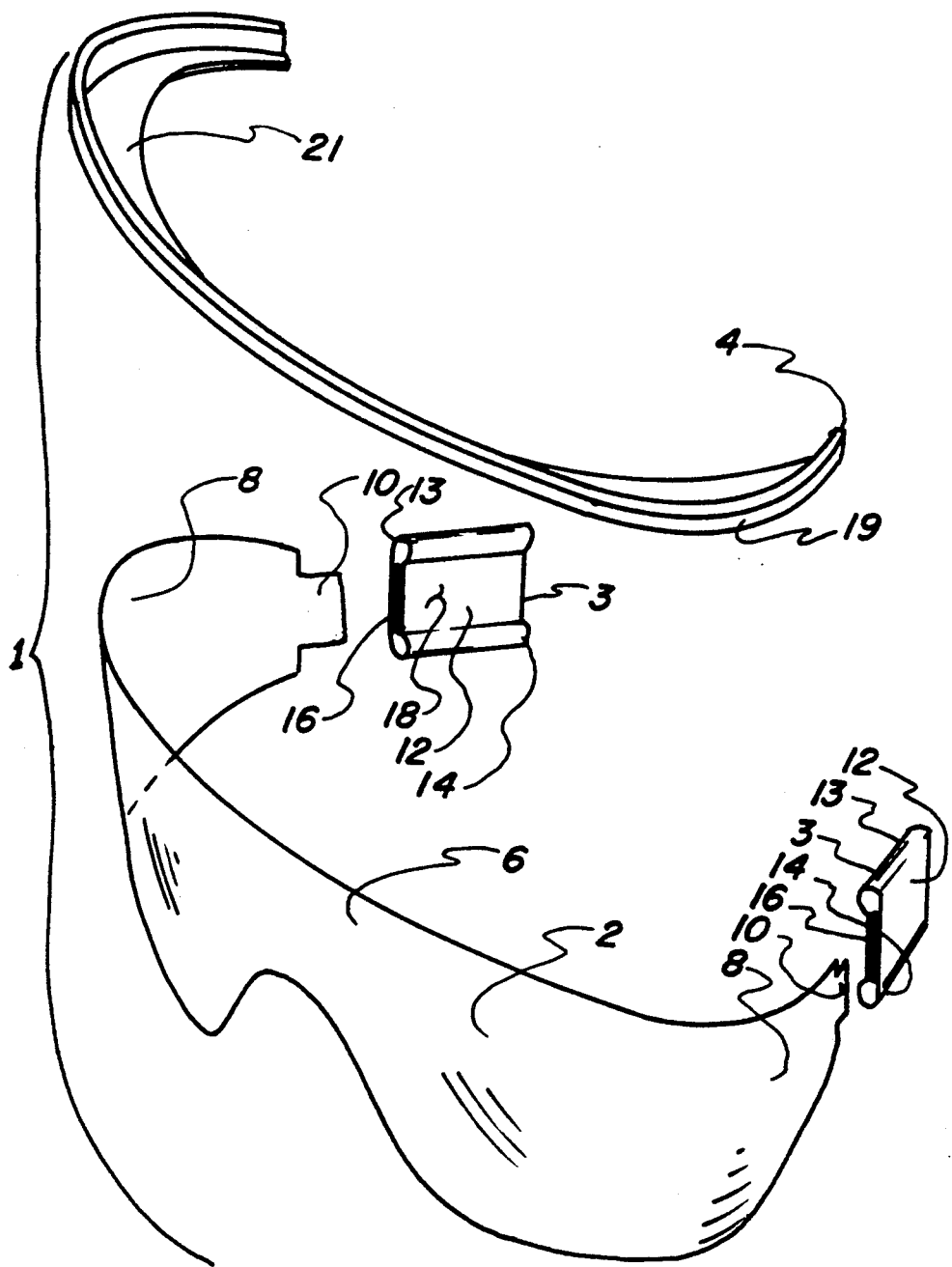
FIG. 1 is an exploded perspective view of the removable sunglass assembly of this invention.

The following is discussion and description of preferred specific embodiments of the removable sunglass assembly for attachment to a conventional eyeglass assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a removable sunglass assembly of this invention, indicated generally at 1, is used for easy ready attachment and detachment to a conventional eyeglass assembly 5, normally of a prescription type, as will be explained.

The removable sunglass assembly 1 consists mainly of four (4) elements being an arcuate one-piece lens member 2; a pair of spaced side support members 3 interconnected to respective spaced, opposed outer ends of the arcuate one-piece lens member 2; and a top support member 4 connected about an upper periphery of the arcuate one-piece lens member 2.

The arcuate lens member 2 is constructed of a one-piece, semi-rigid plastic, flexible material having a main arcuate front body 6 integral with opposed side sections 8. Each side section 8 is formed with an outer tab or connector lug 10.

The main arcuate front body 6 provides unobstructed 180 degrees plus vision through the conventional eyeglass assembly 5.

The tabs or connector lugs 10 are adapted to securely receive a respective one of the side support members 3 thereon as noted in FIGS. 2 and 3.

As noted in FIGS. 1 and 3, the side support members 3 are identical, each including a central body section 12 formed integrally with upper and lower ridge members 13, 14, having a lens support slot 16, and an inner contact surface 18.

The upper and lower ridge members 13, 14 act to define a retaining area therebetween thereagainst a portion of the bow members conventional eyeglass assembly 5 in a manner to be explained.

The side support members 3 are constructed of a resilient rubber type material having a high-friction, anti-skid resistant material so as to hold the removable sunglass assembly in a firmly mounted position on the conventional eyeglass assembly 5 as will be noted.

The top support member 4 has an outer ridge member 19 integral with a main support body 21 and provided with a lens connector slot 23 as best noted in FIG. 4.

The lens connector slot 23 is operable to receive the arcuate lens member 2 therein in a secure manner with the shape being controlled by the flexible arcuate lens member 2.

As noted in FIG. 2, the conventional eyeglass assembly 5 is provided with a pair of spaced prescription lens members 26 mounted within a lens frame 27 which, in turn, is connected to spaced bow members 28 having an ear piece 29 mounted on outer ends thereof.

The bow members 28 are provided with an exterior contact surface 31 to receive the side support members 3 thereagainst when in the assembled condition as noted in FIG. 2.

Figure 5:
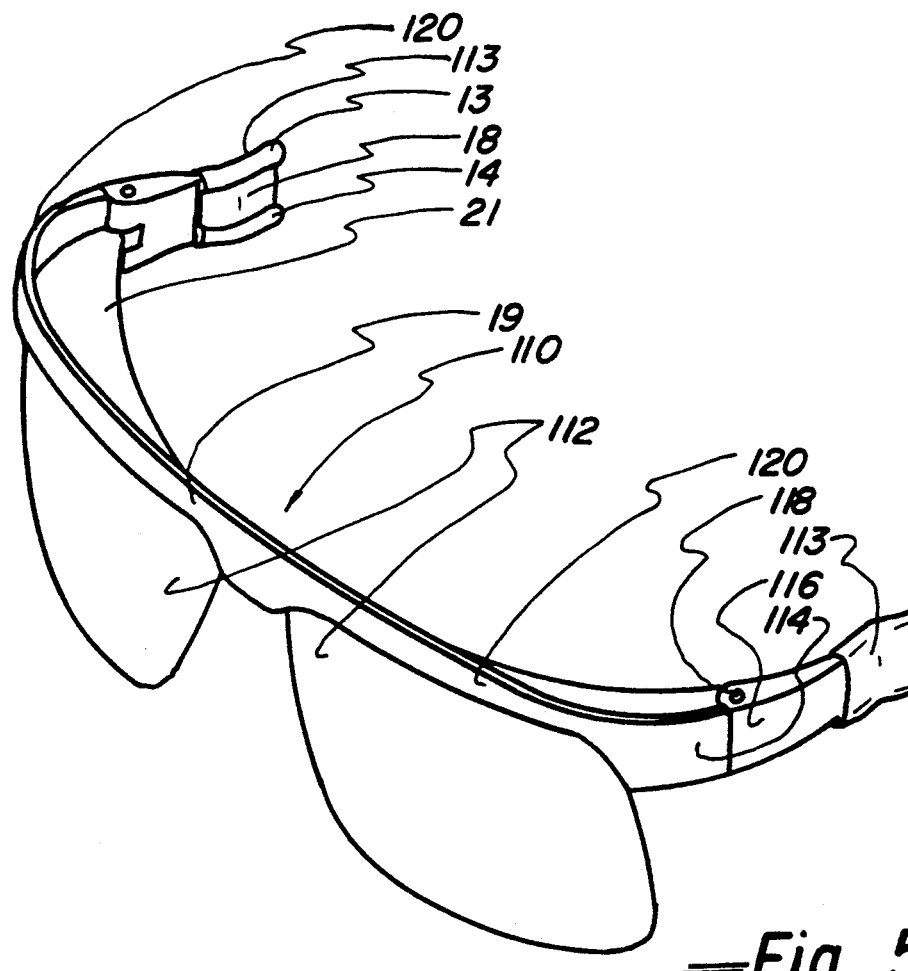
FIG. 5 is a perspective view of a second embodiment of the removable sunglass assembly of this invention.

In a second embodiment of this invention as noted in FIG. 5, the removable sunglass assembly 110 is provided with removable lens members 112 mounted within a main top support member 114 and having side support members 113 connected thereto.

The top support member 114 is constructed of a flexible material so as to provide inward force at outer ends thereof for reasons to be explained.

The side support members 113 are identical to the side support members 3 as described in the first embodiment except they are mounted on side support piece members 116. The side support piece members 116 are pivotally mounted on respective shaft members 118 and connected to the main top support member 114.

It is seen that the side support piece members 116 are limited in outer pivotal movement to a position as noted in FIG. 5 similar to the bow members of the conventional eyeglass assembly 5. Outer end portions 120 of the main top support member 114 can be moved outwardly about a central portion similar to the movement of the arcuate lens member 2 of the first embodiment.

USE AND OPERATION OF THE INVENTION

The attachment of the removable sunglass assembly 1 to the conventional eyeglass assembly 5 is accomplished by first grasping the spaced opposed ends of the side support members 3 for bending the arcuate lens member 2 outwardly. The flexibility of the one-piece arcuate lens member 2 and the top support member 4 allows the removable sunglass assembly 1 to fit over a wide range of shapes, sizes, and styles of conventional eyeglass assemblies 5.

On releasing the outward pressure from the side support members 3 of the removable sunglass assembly 1, the one-piece arcuate lens member 2 will then spring inwardly until the inner contact surface 18 of respective ones of the side support members 3 contact the exterior contact surface 31 of the bow members 28 of the conventional eyeglass assembly 5.

Since the arcuate lens member 2 is still deflected from its relaxed position when it contacts the exterior contact surface 31 of the bow members 28, it pushes in on the bow members 28 with a clamping force. This clamping force applied by the arcuate lens member 2 is transmitted through the side support members 3 to the bow members 28 of the conventional eyeglass assembly 5.

As the side support members 3 are fabricated of a high-friction, rubber like material, they provide a means for both attaching and locating the removable sunglass assembly 1 vertically and along a longitudinal axis of the respective bow members 28.

As the side support members 3 are provided with the central body section 12 within the upper and lower spaced inwardly projected ridge members 13, 14, clamping force for the location of the removable sunglass assembly 1 can be adjusted by positioning the bow members 28 anywhere between the upper and lower ridge members 13, 14.

Once in position, the clamping force of the one-piece arcuate lens member 2 and the friction force of the side support members 3 insure that the removable sunglass assembly 1 will remain in that position.

The flexible nature of the side support members 3 allows them to conform to the shape of the exterior contact surface 31 of the bow members 28, thus maximizing the friction contact force by increasing the area of contact.

When attached to the conventional eyeglass assembly 5, the removable sunglass assembly 1 is further located and secured by the top support member 4 as noted in FIG. 4. The conventional eyeglass assembly 5 provides interaction with support of the main support body 21 of the top support member 4 on top of the lens frame 27 to provide vertical support.

The top support member 4 is preferrably fabricated of a high-friction rubber like material similar to the side support members 3 and is operable to keep the removable sunglass assembly 1 from sliding off contact with the conventional eyeglass assembly 5.

On use and operation of the second embodiment of this invention, the lens members 112 do not provide structural support which is achieved by the main top support member 114 being the removable eyeglass assembly 110 as noted in FIG. 5.

In fact, the main top support member 114 of the second embodiment provides structural support, flexibility, and clamping force which was previously provided by the one-piece arcuate lens member 2 of the first embodiment.

The function of the side support members 113 is substantially identical to that of the first embodiment except they are interconnected to the side support piece members 116 which are pivotally mounted on the shaft members 118.

The side support members 116 are pivoted inwardly from the position of FIG. 5 and not outwardly with the pivotal movement aiding in providing for folding collapse of the entire removable sunglass assembly 110 for storage and conveyance.

The removable sunglass assembly 110 provides many fashion alternatives as well as the opportunity to take advantage of materials. Since the lens members 112 are no longer a structural component, they can be made of a thinner, lightweight material and shaped into any style.

The functionality of the removable sunglass assembly 1 is further enhanced by the addition of a strap that attaches to either the one-piece arcuate lens member 2, the side support members 3, or the top support member 4 allowing the wearer to hang the removable sunglass assembly 1 about the neck when not in use.

In addition to being easy to attach and remove from the conventional eyeglass assembly, the removable sunglass assembly, containing no conventional clips, springs, screws, or moving parts, is very reliable and inexpensive to manufacture without any maintenance required.

The one-piece arcuate lens member not only achieves a minimum number of parts, but is designed in such a way as to conform to a use so fabricating can be made through a wire electronic discharge machining operation which significantly reduces the initial tooling cost.

The removable sunglass assemblies have a minimum amount of moving parts; can be easily attached to and removed from conventional prescription eyeglass assemblies; are attractive in appearance; are easily carried as an accessory to a conventional eyeglass assembly; are economical to manufacture; and are substantially maintenance free.

While the invention has been described in conjunction with preferred specific embodiments thereof, it will be understood this description is intended to illustrate and not to limit the scope of the invention, which is defined by the following claims:

We claim:

1. A removable sunglass assembly adapted to be releasably connected to a conventional eyeglass assembly having a lens frame with lens members and bow members pivotally connected to opposed outer ends of the lens frame, comprising:
   a) an arcuate lens member having integral outer side sections biased inwardly toward each other;
   b) outer side support members connected to respective ones of said outer side sections;
   c) said outer side sections each has a laterally extending connector lug; and
   d) said outer side support members each has a lens support slot formed therein for receiving respective ones of said connector lug of said arcuate lens member;

whereby said side support members contact outer respective surfaces of the bow members in a clamped, inwardly biased manner to hold said removable sunglass assembly on the conventional eyeglass assembly.

2. A removable sunglass assembly adapted to be releasably connected to a conventional eyeglass assembly having a lens frame with lens members and bow members pivotally connected to opposed outer ends of the lens frame, comprising:
   a) an arcuate main top support member having outer end sections biased inwardly toward each other;
   b) side support piece members connected to respective ones of said outer end sections; and
   c) side support members connected to respective ones of said side support piece members;

whereby said side support piece members are operable to retain the bow members of the conventional eyeglass assembly between said side support members to provide a means for retaining said removable sunglass assembly on a conventional eyeglass assembly.

3. A removable sunglass assembly as described in claim 2, wherein:
   said main top support member is constructed of a flexible resilient material having outer ends thereof biased inwardly towards each other for clamping said side support piece members against an outer surface of the bow members of the conventional eyeglass assembly.

4. A removable sunglass assembly as described in claim 2, wherein:
said side support members is constructed of a flexible, anti-skid, high-friction material to contact, position, and hold onto bow members of the conventional eyeglass assembly thereagainst.

5. A removable sunglass assembly as described in claim 2, wherein:
said side support piece members pivotally connected to said main top support member and movable from a usage position inwardly to a folded position for storage and conveyance.

6. A removable sunglass assembly as described in claim 2, wherein:
said side support members each has a central body section with integral upper and lower spaced ridge members defining an inner contact surface between said upper and lower ridge members;
whereby said side support members are operable to retain the bow members of the conventional eyeglass assembly between said upper and lower ridge members in contact with said inner contact surface to provide a means for retaining said removable sunglass assembly on the conventional eyeglass assembly.

7. A removable sunglass assembly connected to a conventional eyeglass assembly having two prescription lenses, a lens frame, and two bow members extending aft from the lens frame, comprising:
a) a one-piece transparent lens member fabricated of resilient plastic, said lens member flexing outward and mounted about the lens frame and the respective bow members to a point on said bow members part way back between the user's ear member and said lens frame;
b) a pair of opposing side support members each affixed to said lens member for providing a means of locating and attaching a rear portion of said removable sunglass assembly engaged with said bow members of said lens frame;
c) a top support member connected to said lens member to support said removable sunglass assembly on a top surface of said lens frame; and
d) said top support member fabricated of resilient plastic, said top support member flexing outward for attachment to said conventional eyeglass assembly and, upon attachment, wrapping around said lens frame to a point on said bow member part way back between the user's ear and said lens frame, said top support member providing a means of locating and attaching said removable sunglass assembly to said top surface of said lens frame.

8. A removable sunglass assembly as described in claim 7, wherein:
a) said lens member formed so that, upon attachment to said conventional eyeglass assembly, said lens member is prevented from returning to its fully relaxed position and, thus, imparts a clamping force in a direction normal to said bow members of said conventional eyeglass assembly;
b) said side support members each 1) possessing a ridge member extending front to back on both top and bottom of said support member, said ridge members extending inward to provide upper and lower stops for locating said removable sunglass assembly on said bow members of said conventional eyeglass assembly; 2) constructed of a high-friction, rubber-like material for securely attaching said removable sunglass assembly to said bow members of said conventional eyeglass assembly when clamping force is applied to said bow members by the aforementioned said lens member; 3) being of a flexible nature allowing said side support members to conform to said bow members of said conventional eyeglass assembly, thus maximizing retention force by increasing an area of contact between said side support members and said bow members; and
c) said top support member having a flange which extends inward providing a means for said removable sunglass assembly to rest on said top surface of said lens frame, said top support surface fabricated of high-friction, rubber-like material, thus providing a friction force to keep said removable sunglass assembly from sliding off of said lens frame.

9. A removable sunglass assembly as described in claim 7, wherein:
said top support member is formed so that, upon attachment to the conventional eyeglass assembly, said top support member is prevented from returning to its fully relaxed position and, thus, imparts a clamping force in a direction normal to said bow members of the conventional eyeglass assembly.

10. A removable sunglass assembly adapted to be releasably connected to a conventional eyeglass assembly having a lens frame with lens members and bow members pivotally connected to opposed outer ends of the lens frame, comprising:
a) an arcuate lens member has outer side sections biased inwardly toward each other;
b) outer side support members connected to respective ones of said outer side sections;
c) said outer side sections each having a laterally extending connector lug; and
d) said outer side support members each has a lens support slot formed therein for receiving respective ones of said connector lug of said arcuate lens member;
whereby said side support members contact outer respective surfaces of the bow members in a clamped, inwardly biased manner to hold said removable sunglass assembly on the conventional eyeglass assembly.

11. A removable sunglass assembly as described in claim 10, wherein:
a top support member secured to an upper peripheral edge of said arcuate lens member to provide support and strength thereto and biased inwardly similar to said arcuate lens member.

12. A removable sunglass assembly as described in claim 10, wherein:
said side support members are constructed of a resilient high-friction, anti-skid material.

13. A removable sunglass assembly as described in claim 10, wherein:
said side support members each has a central body section with integral upper and lower spaced ridge members defining an inner contact surface between said upper and lower ridge members;
whereby said side support members are operable to retain the bow members of the conventional eyeglass assembly between said upper and lower ridge members in contact with said inner contact surface to provide a means for retaining said removable sunglass assembly on the conventional eyeglass assembly.

14. A removable sunglass assembly adapted to be releasably connected to a conventional eyeglass assembly having a lens frame with lens members and bow members pivotally connected to opposed outer ends of the lens frame, comprising:
 a) an arcuate lens member having integral outer side sections biased inwardly toward each other;
 b) outer side support members connected to respective ones of said outer side sections; and
 c) said side support members are constructed of a resilient high-friction, anti-skid material;
whereby said side support members contact outer respective surfaces of the bow members in a clamped, inwardly biased manner to hold said removable sunglass assembly on the conventional eyeglass assembly.

15. A removable sunglass assembly adapted to be releasably connected to a conventional eyeglass assembly having a lens frame with lens members and bow members pivotally connected to opposed outer ends of the lens frame, comprising:
 a) an arcuate lens member having integral outer side sections biased inwardly toward each other;
 b) outer side support members connected to respective ones of said outer side sections; and
 c) said arcuate lens member is constructed of a flexible, resilient plastic material with said arcuate side sections biased inwardly towards each other due to the material from which said arcuate lens member is constructed;
whereby said side support members contact outer respective surfaces of the bow members in a clamped, inwardly biased manner to hold said removable sunglass assembly on the conventional eyeglass assembly.

* * * * *